C. H. FARLAND & A. SWANSON.
FOLDABLE TRUCK.
APPLICATION FILED NOV. 4, 1908.
920,553.
Patented May 4, 1909.
2 SHEETS—SHEET 1
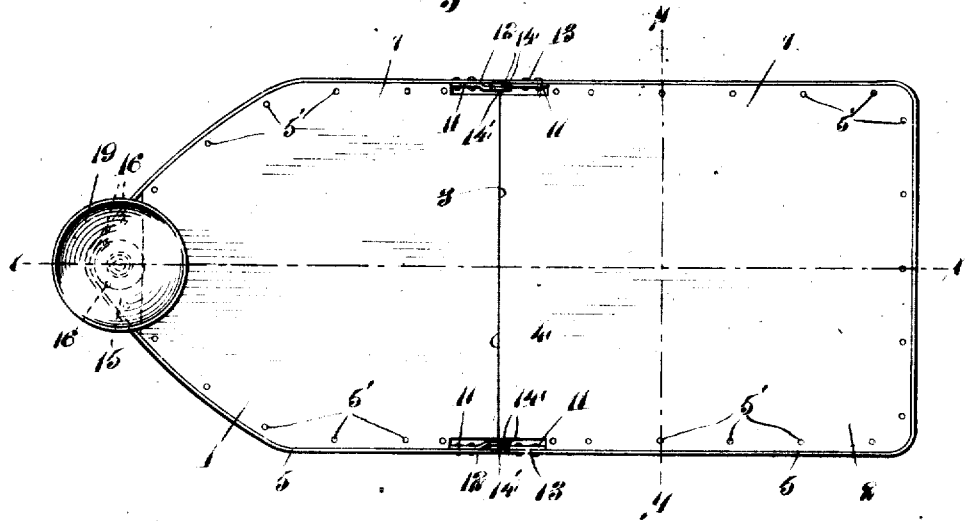
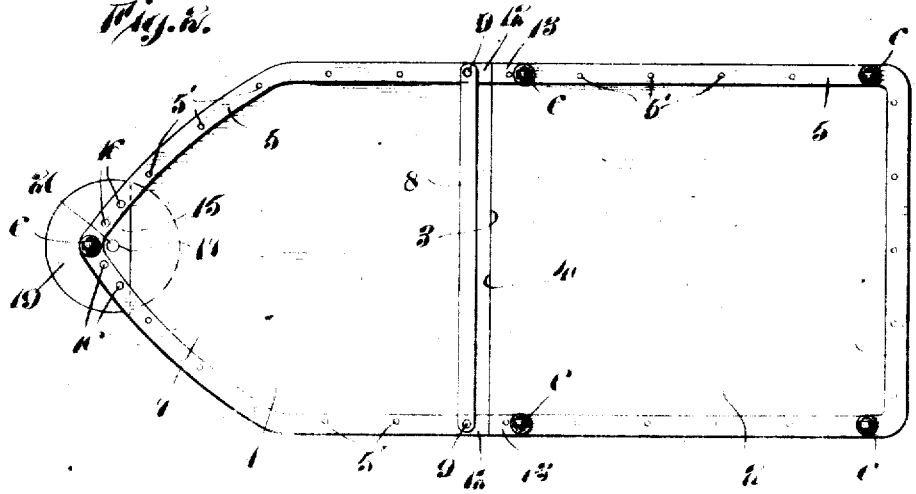

C. H. FARLAND & A. SWANSON.
FOLDABLE TRUCK.
APPLICATION FILED NOV. 4, 1908.
920,553.
Patented May 4, 1909.
2 SHEETS—SHEET 2.
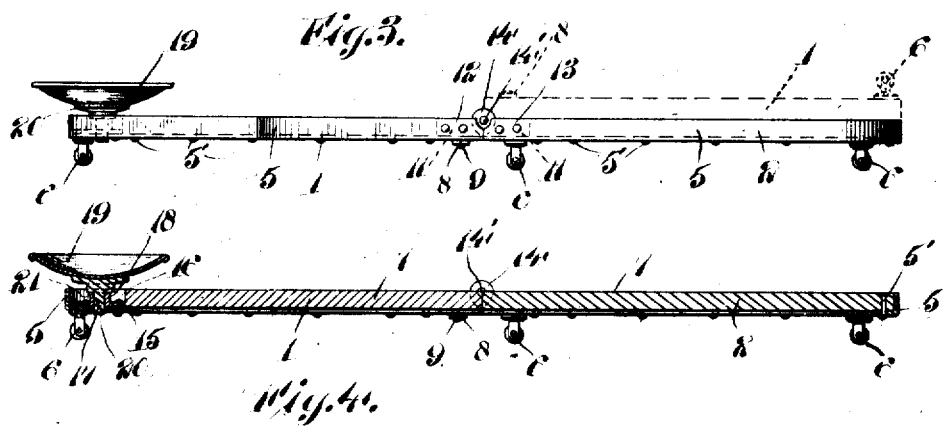
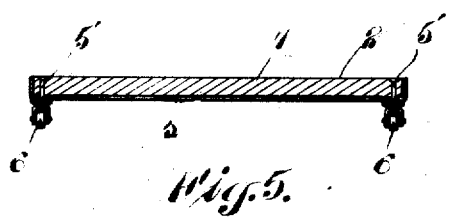
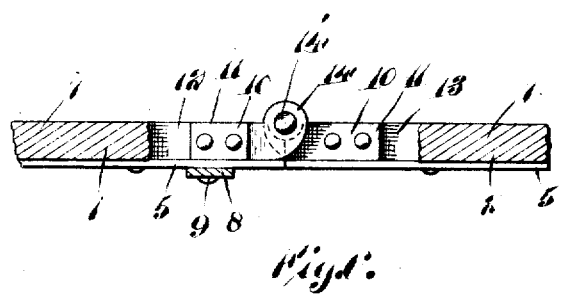

UNITED STATES PATENT OFFICE.

CORNELIUS H. FARLAND AND ANTHONY SWANSON, OF CHICAGO, ILLINOIS.

FOLDABLE TRUCK.

No. 920,553.　　　Specification of Letters Patent.　　Patented May 4, 1909.

Application filed November 4, 1908. Serial No. 460,990.

*To all whom it may concern:*

Be it known that we, CORNELIUS H. FARLAND and ANTHONY SWANSON, citizens of the United States, residing at Chicago, county of Cook, and State of Illinois, have invented certain new and useful Improvements in Foldable Trucks, of which the following is a specification.

Our invention relates to improvements in foldable trucks.

The object of our invention is to provide a truck of the character mentioned, which will be of such construction as to be particularly applicable for use in repairing those parts of a vehicle, more especially of an automobile, accessible only from beneath the vehicle.

At the present time upon the breakage or other disablement of a part of a vehicle, especially of an automobile, accessible only from beneath, it becomes necessary in order to facilitate repairing such part, for the vehicle operator to crawl beneath the machine, which as known, is very awkward and inconvenient, moreover, it often results in a loss of time and soiling of clothing.

The object of our invention is to obviate such inconvenience by providing a truck which will be of such construction as to be adapted to support the body of a man, in lying down position, said truck being adapted to be readily and easily rolled beneath an automobile, and, upon the repair being made, to be readily rolled from beneath the machine; hence, a truck serving in the capacity and obviation of the inconveniences as stated.

A still further object of our invention is to provide a foldable truck of the character mentioned, which will be adapted, when not in use, to be folded together so as to occupy a small space for storage and transportation.

A still further object is to provide a truck of the character mentioned, which will be strong and durable, simple of construction, hence of low cost to manufacture.

Other objects will appear hereinafter.

With these objects in view, our invention consists in a truck characterized as above-mentioned and in certain details of construction and arrangement of parts, all as will be hereinafter more fully described, and particularly pointed out in the claims.

Our invention will be more readily understood by reference to the accompanying drawings forming a part of this specification, and in which, Figure 1 is a top plan view of the preferred form of our device, Fig. 2 is a bottom plan view thereof, Fig. 3 is a side elevation thereof, Fig. 4 is a vertical longitudinal section taken on the line $x$—$x$ of Fig. 1, Fig. 5 is a vertical transverse section taken on the line $y$—$y$ of Fig. 1, Fig. 6 is a sectional detail of the hinge means embodied in our invention, and Fig. 7 is a side elevation of the head rest embodied in our invention detached.

Referring now to the drawings, our improved truck consists of the forward and rearward sections 1 and 2, respectively, the same being hinged together at their adjoining edges 3 and 4. Said sections are preferably of equal lengths, but of slightly different shapes, the forward section 1 being preferably substantially triangular in shape, whereas the rearward section 2 is rectangular as shown, the same being of such shapes so as to conform more nearly to the shape of the body of a man, it being our object to provide a truck occupying a small amount of space and one of as light weight as possible. Each of said truck sections, is constructed of an angle iron frame 5, preferably of a single piece of material, shaped as stated, to which is suitably secured, preferably by means of screws, or bolts 5', a platform 7, the latter being formed of any suitable material, but preferably of wood of such a thickness that the upper surface thereof will be flush with the upper edge of said frame. 8 is a brace-bar, the end portions thereof being secured as by rivets 9 to the forward truck section frame 5. Any suitable form of hinge means may be employed for securing said sections together. However, the preferable form of hinge means, that is, the form shown in the drawings, consists of substantially similar hinge members 10, the shanks 11 of which are secured, preferably riveted to the inside surface of the vertically extending portions of the adjoining frame end portions 12 and 13. The perforated overlapping forward end portions 14 of said members 10 are preferably circular in shape and project above the edge of the frame, as clearly shown in Fig. 6, the axis of the hinge-pin 14', passing through the perforations in said portions 14, lying in the same plane as the surface of the platform. By this construction it is, obvious that the truck may be readily folded together, the sections thereof in which event, lie in parallel planes, with their top surfaces adjoining, such position of the truck sections is shown by dotted lines in Fig. 3. Provided at suitable points upon the under surface of said truck sections, the same being preferably secured to the frame 5 thereof, are casters 6, preferably five in number, one being provided at the forward end portion of the section 1, the other four being secured to the section 2, one at each of the corners thereof. It is understood that casters of any ordinary or preferred form may be employed without departing from the spirit of our invention.

The forward end portion of the truck section 1, is provided with a plate 15, secured as by rivets 16 to the frame 5 thereof, the forward end portion of the platform of said section being, as clearly shown in Fig. 4, cut away, so as to accommodate said plate. Said plate 15 is perforated as at 17, and is provided with an upwardly extending flange 18 surrounding said perforation.

19 is a concave disk, preferably of sheet metal, the same being of any suitable diameter. The downwardly extending cylindrical stem or base 20 of said disk is adapted to fit snugly in the socket-forming perforation 17 of the plate 15, the shoulder 21 formed upon said stem 20, being adapted, when said stem is positioned in said pocket, to rest upon the upper edge of the flange 18, as clearly shown in Fig. 4.

When using our device, the same being arranged as shown in the drawings, that is with the truck unfolded and the head rest in position, it is obvious that the repairer may lie down thereon face upward, in which case, the disk member 19 acts as a head rest, whereupon the truck may be rolled under the automobile or other vehicle. The repair upon the vehicle being made, the truck may then be rolled back again. By the provision of such a device, it is evident that access to an under part of a machine may readily and quickly be facilitated, and without danger or damage to the clothing. In order to further protect the clothing, the upper surface of the truck sections may be covered with a carpet or other suitable material, although the latter is not essential. Upon finishing using the device, the head rest being removed, the same may be folded together, as before stated.

Because of its occupying such a comparatively small amount of space, the device may readily be carried in any suitable place in an automobile.

While we have shown what we deem to be the preferable form of our device, we do not wish to be limited thereto, as there might be many changes made in the arangement of details and construction of parts without departing from the spirit of our invention. And although we have constructed our device for the special purpose of supporting a man, while repairing a vehicle from beneath, it is understood that we might use the same for any other purpose for which it is applicable.

Having described our invention what we claim as new, and desire to secure by Letters Patent, is:

1. A truck comprising foldable platform sections hingedly secured together at their adjoining edges, casters provided upon the under surface of said sections, and a head rest detachably secured to the upper surface of the end portion of one of said sections, substantially as and for the purpose specified.

2. A truck comprising foldable platform sections hingedly secured together at their adjoining edges, casters fixed to the under surfaces of said sections, one being provided at the forward end portion of one of said sections and four being provided upon the other of said sections one at each corner thereof, a head rest detachably secured to the end portion of one of said sections, substantially as and for the purpose specified.

3. A truck comprising foldable platform sections hingedly secured together at the extremities of their adjoining edges, casters secured to the under surface of said sections at the end portion thereof, a concave disk, and means for detachably securing said disk to the upper surface of the end portion of one of said sections, substantially as and for the purpose specified.

4. A truck comprising foldable sections, hingedly secured together at the extremities of their adjoining edges, said sections being adapted to be folded into parallel planes, each of said sections consisting of a metal peripheral frame and a platform secured in said frame, casters secured to the under surface of said frames, substantially as and for the purpose specified.

5. A truck comprising foldable sections hingedly secured together at the extremities of their adjoining edges, each of said sections consisting of an angle iron peripheral frame, and a platform secured in said frame, the forward truck section being substantially triangular in shape, the rearward of said sections being rectangular in shape, casters secured to the under surface of said section frames one being secured to the forward end portion of the forward truck section, a number of said casters being secured to the rearward of said sections, a head rest, and means of detachably securing the same to the upper surface of the forward end portion of the forward truck section, substantially as described.

6. A truck comprising foldable sections of equal lengths hingedly secured together at the extremities of their adjoining edges, said sections being adapted to be folded into parallel planes, each of said sections consisting of an angle iron peripheral frame, and a platform secured therein, a head rest, said head rest consisting of a concave disk and a stem depending from the under surface thereof, said stem being adapted to be received in a socket provided in the forward end portion of one of said sections, and casters provided upon the under surface of said sections, substantially as described.

In testimony whereof we have signed our names to this specification in the presence of two subscribing witnesses.

CORNELIUS H. FARLAND.
ANTHONY SWANSON.

Witnesses:
  HELEN F. LILLIS,
  JANET E. HOGAN.